United States Patent
Fu et al.

(10) Patent No.: US 11,048,638 B1
(45) Date of Patent: Jun. 29, 2021

(54) HOST CACHE-SLOT AWARE 10 MANAGEMENT

(71) Applicant: EMC IP Holding Company LLC, Hopkinton, MA (US)

(72) Inventors: Jack Fu, Brighton, MA (US); Jaeyoo Jung, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/779,727

(22) Filed: Feb. 3, 2020

(51) Int. Cl.
G06F 12/00 (2006.01)
G06F 12/0888 (2016.01)
G06F 3/06 (2006.01)
G06F 12/084 (2016.01)
G06F 12/0875 (2016.01)

(52) U.S. Cl.
CPC ........ G06F 12/0888 (2013.01); G06F 3/0604 (2013.01); G06F 3/067 (2013.01); G06F 3/0635 (2013.01); G06F 12/084 (2013.01); G06F 12/0875 (2013.01); G06F 2212/452 (2013.01); G06F 2212/621 (2013.01)

(58) Field of Classification Search
CPC .. G06F 16/185; G06F 16/24578; G06F 3/061; G06F 3/0647; G06F 3/0685
See application file for complete search history.

(56) References Cited

U.S. PATENT DOCUMENTS

| | | | |
|---|---|---|---|
| 5,592,432 | A | 1/1997 | Vishlitzky et al. |
| 2014/0237183 | A1 | 8/2014 | Venkatesh et al. |
| 2018/0275919 | A1 | 9/2018 | Chirumamilla et al. |
| 2019/0391920 | A1 | 12/2019 | Gupta et al. |

OTHER PUBLICATIONS

U.S. Appl. No. 16/777,129, filed Jan. 30, 2020, Fu, et al.
Prateek Sharma, "Page Cache Management in Virtual Environments," Department of Computer Science and Engineering Indian Institute of Technology, Bombay Mumbai, Roll No: 09305910, Jun. 28, 2012, https://people.cs.umass.edu/~prateeks/papers/mtp.pdf.
"Performance Best Practices for VMware vSphere 6.7," VMware ESXI 6.7, vCenter Server 6.7, Jul. 27, 2018, https://www.vmware.com/content/dam/digitalmarketing/vmware/en/pdf/techpaper/performance/vsphere-esxi-vcenter-server-67-performance-best-practices.pdf.

(Continued)

*Primary Examiner* — Yong J Choe
(74) *Attorney, Agent, or Firm* — Muirhead and Saturnelli, LLC

(57) ABSTRACT

A host system may be cache-slot aware such that the host system can distribute IOs to processing nodes on a storage system according to cache slot boundaries. A multi-path driver of the host system may determine the cache slot size from one or more communications exchanged with the storage system. The multi-path driver may transition between processing nodes according to slot cache slot boundaries. For IO operations having data portions smaller than the cache slot size, the MP driver may direct multiple IO operations to a same processing node until the collective size of data portions fills a cache slot. For IO operations having a data portion larger than the cache slot, the MP driver may divide the IO operation into sequential IO operations having data portions of a same size as a cache slot, and may transition between processing nodes for each IO operation or a multiple thereof.

20 Claims, 8 Drawing Sheets

(56) References Cited

OTHER PUBLICATIONS

Jonathan Corbet, et al., "Chapter 15. Memory Mapping and DMA," Linux Device Drivers, 3rd Edition, Feb. 2005, https://www.oreilly.com/library/view/linux-device-drivers/0596005903/ch15.html.

Hewlett Packard Enterprise, "HPE Primera Architecture," Technical White Paper, Ref. 4, Dec. 2020, https://assets.ext.hpe.com/is/content/hpedam/a50000189enw.

James Salvadore, "Dell EMC VMAX All Flash: Family Overview," DELLTechnologies, Technical White Paper, Sep. 2020, https://www.delltechnologies.com/en-id/collaterals/unauth/white-papers/products/storage/h14920-intro-to-vmax-af-storage.pdf.

DellEMC, "Dell EMC VMAX3 and VMAX All Flash Quality of Service Controls for Multitenant Environments," Sep. 2016, https://www.delltechnologies.com/resources/en-us/asset/white-papers/products/storage-2/h15498-dell-emc-vmax3-and-vmax-all-flash-quality-of-service-controls-for-multi-tenant-environments.pdf.

Steven Poitras, "A Brief Lesson in History," The Nutanix Bible, 2021, https://nutanixbible.com.

"Chapter 5. Virtual Storage," retrieved from https://vvww.virtualbox.org/manual/ch05.html on Mar. 8 2021.

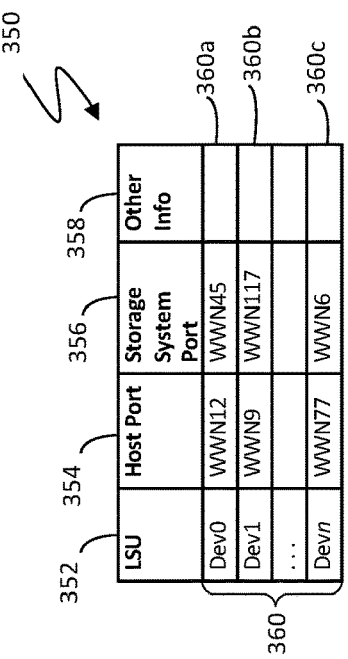
FIG. 3D
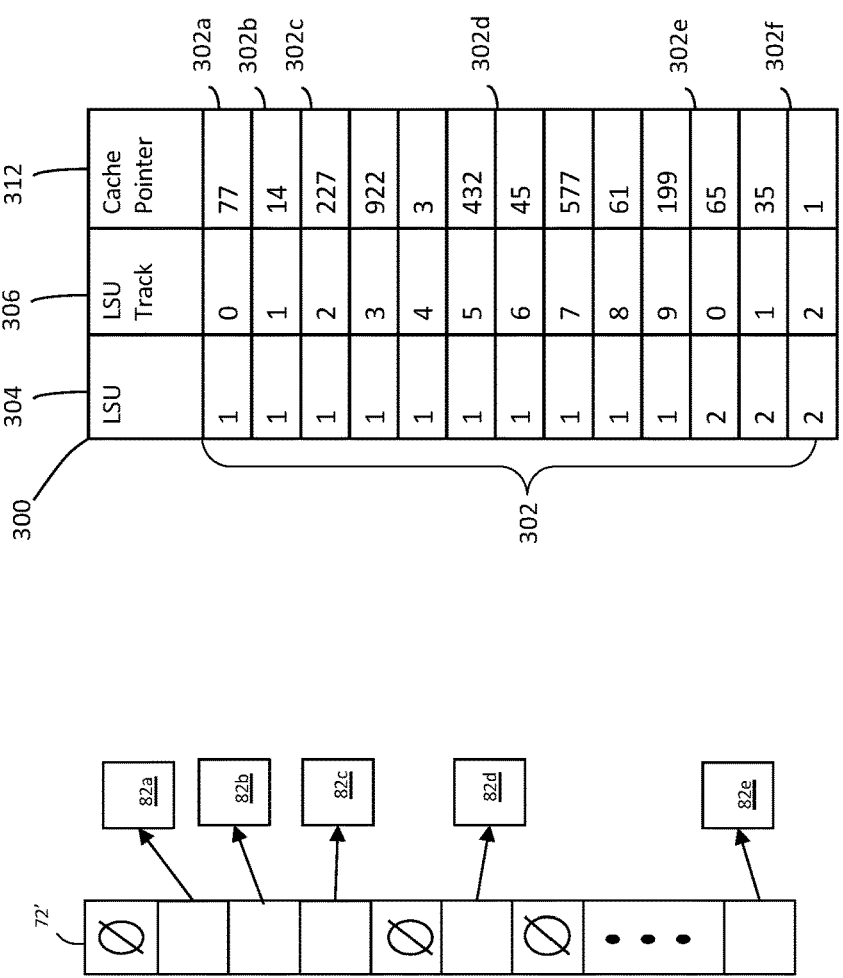
FIG. 3C
FIG. 3B

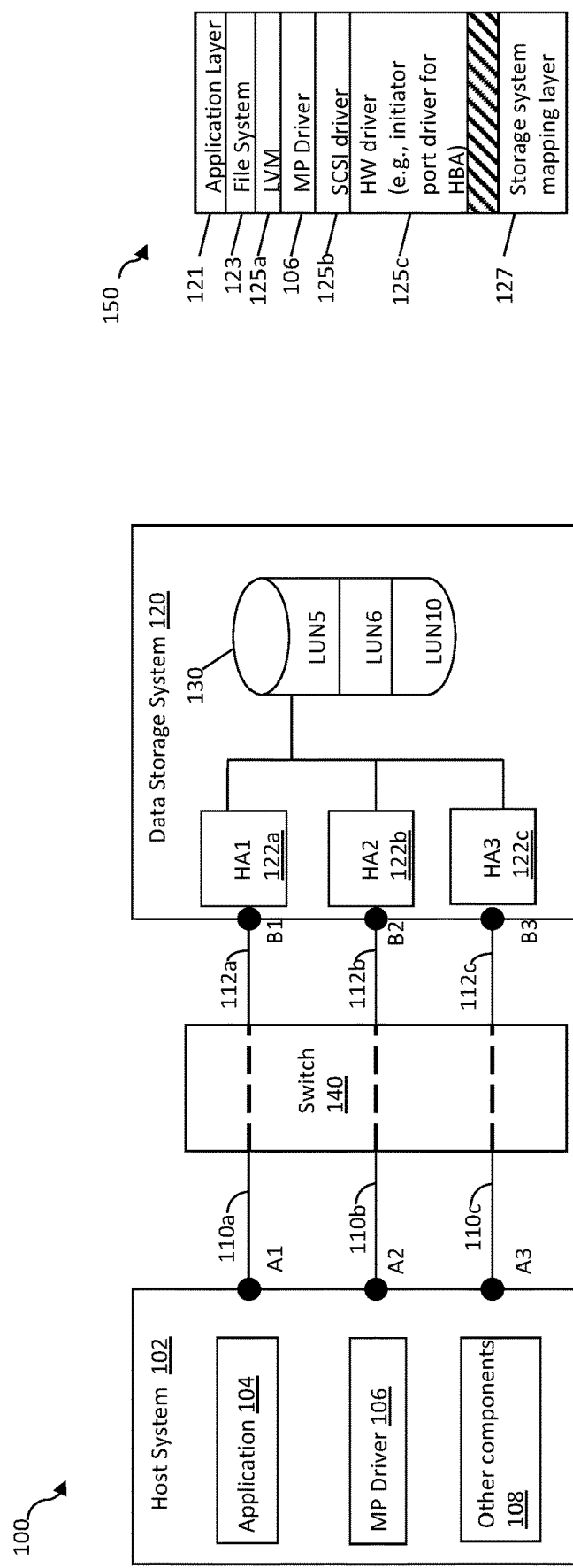

HOST CACHE-SLOT AWARE IO MANAGEMENT

BACKGROUND

Technical Field

This application generally relates to data storage systems, and more particularly to host management of IO distribution on a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used.

Host systems may not address the physical storage devices (e.g., disk drives or flash drives) of a storage systems directly, but rather access to data may be provided to one or more host systems from what the host systems view as a plurality of logical storage units (LSUs) including, for example, logical blocks, logical devices (also referred to as logical volumes, LUNs, logical storage units and/or logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a storage network including a storage system having a plurality of physical storage devices for storing data and a memory cache including a plurality of cache slots, and a host system having an application executing thereon that results in IO operations being sent to the storage system. The method is performed on the host system, and includes accessing an IO operation received from the application executing on the host system, determining that the IO operation is a sequential IO operation, determining whether a data portion of the IO operation will fit in a current cache slot of the plurality of cache slots currently being used for IO operations of the application, and selecting an IO path between the host system and the storage system for the IO operation based at least in part on the determination of whether a data portion will fit in the current cache slot. The storage system may further include a plurality of physically discrete storage processing nodes, each storage processing node including a compute component for executing logic to process IO operations and a memory, the memory including a cache segment for use as part of a shared cache distributed across the plurality of processing nodes, and the shared cache may include the plurality of cache slots, and the method may further include determining a predefined number of cache slots to be consumed on a processing node for sequential IO operations before transitioning to a next processing node, wherein the IO path is selected based at least in part on the predefined number of cache slots. The current cache slot may be on a current processing node of the plurality of processing nodes, and it may be determined that the data portion of the IO operation will not fit in the current cache slot of the plurality of cache slots, and selecting the IO path may include selecting, based at least in part on the predefined number and the determination that the data portion will not fit in the current cache slot, an IO path corresponding to a next processing node of the plurality of processing nodes in a predefined order of the plurality or processing nodes. The current cache slot may be on a current processing node of the plurality of processing nodes, and it may be determined that the data portion of the IO operation will not fit in the current cache slot of the plurality of cache slots, and selecting the IO path may include selecting, based at least in part on the predefined number and the determination that the data portion will not fit in the current cache slot, an IO path corresponding to the current processing node. The storage system further may include a plurality of physically discrete storage processing nodes, each storage processing node including a compute component for executing logic to process IO operations and a memory, the memory including a cache segment for use as part of a shared cache distributed across the plurality of processing nodes, wherein the shared cache may include the plurality of cache slots, and the current cache slot may be on a current processing node of the plurality of processing nodes, and it may be determined that the data portion of the IO operation will fit in the current cache slot of the plurality of cache slots, and, based at least in part on the determination that the data portion will fit in the current cache slot, the selected IO path may be an IO path corresponding to the current processing node. Each of the plurality of cache slots ay have a predefined size, and the method further may include determining that a size of the data portion is larger than the predetermined size; and dividing the IO operation into multiple IO operation according to the predefined size. The method may further include tagging an IO communication including the IO operation with an indication that the IO operation is a sequential IO operation, and sending the IO communication along the selected IO path to the storage system.

In some embodiments of the invention, a host system is provided for a storage network including a storage system having a plurality of physical storage devices for storing data and a memory cache including a plurality of cache slots, and the host system. The host system includes an application executing on the host system resulting in IO operations being sent to the storage system, and a memory having code thereon that, when executed, performs a method. The method includes accessing an IO operation received from the application executing on the host system, determining that the IO operation is a sequential IO operation, determining whether a data portion of the IO operation will fit in a current cache slot of the plurality of cache slots currently being used for IO operations of the application, and selecting an IO path between the host system and the storage system for the IO operation based at least in part on the determination of whether a data portion will fit in the current cache slot. The storage system further may include a plurality of physically discrete storage processing nodes, each storage processing node including a compute component for executing logic to process IO operations and a memory, the memory including a cache segment for use as part of a shared cache distributed across the plurality of processing nodes, wherein the shared cache may include the plurality of cache slots. The method further may include determining a predefined number of cache slots to be consumed on a processing node for sequential TO operations before transitioning to a next processing node, and the TO path may be selected based at least in part on the predefined number of cache slots. The current cache slot may be on a current processing node of the plurality of processing nodes, and it may be determined that the data portion of the IO operation will not fit in the current cache slot of the plurality of cache slots, and selecting the TO path may include selecting, based at least in part on the predefined number and the determination that the data portion will not fit in the current cache slot, an TO path corresponding to a next processing node of the plurality of processing nodes in a predefined order of the plurality or processing nodes. The current cache slot may be on a current processing node of the plurality of processing nodes, and it may be determined that the data portion of the TO operation will not fit in the current cache slot of the plurality of cache slots, and selecting the TO path may include selecting, based at least in part on the predefined number and the determination that the data portion will not fit in the current cache slot, an TO path corresponding to the current processing node. The storage system further may include a plurality of physically discrete storage processing nodes, each storage processing node including a compute component for executing logic to process TO operations and a memory, the memory including a cache segment for use as part of a shared cache distributed across the plurality of processing nodes, wherein the shared cache may include the plurality of cache slots, and the current cache slot may be on a current processing node of the plurality of processing nodes, and it may be determined that the data portion of the IO operation will fit in the current cache slot of the plurality of cache slots, and, based at least in part on the determination that the data portion will fit in the current cache slot, the selected TO path may be an TO path corresponding to the current processing node. Each of the plurality of cache slots ay have a predefined size, and the method further may include determining that a size of the data portion is larger than the predetermined size, and dividing the IO operation into multiple IO operation according to the predefined size. The method further may include tagging an TO communication including the IO operation with an indication that the IO operation is a sequential TO operation, and sending the TO communication along the selected TO path to the storage system.

In some embodiments of the invention, computer-readable media may be provided for a storage network including a storage system having a plurality of physical storage devices for storing data and a memory cache including a plurality of cache slots, and a host system having an application executing thereon that results in IO operations being sent to the storage system and having the computer-readable media having software stored thereon. The software includes executable code that accesses an IO operation received from the application executing on the host system, executable code that determines that the IO operation is a sequential IO operation, executable code that determines whether a data portion of the IO operation will fit in a current cache slot of the plurality of cache slots currently being used for IO operations of the application, and executable code that selects an IO path between the host system and the storage system for the IO operation based at least in part on the determination of whether a data portion will fit in the current cache slot. The storage system further may include a plurality of physically discrete storage processing nodes, each storage processing node including a compute component for executing logic to process IO operations and a memory, the memory including a cache segment for use as part of a shared cache distributed across the plurality of processing nodes, wherein the shared cache may include the plurality of cache slots, and the software may further include executable code that determines a predefined number of cache slots to be consumed on a processing node for sequential IO operations before transitioning to a next processing node, and the IO path may be selected based at least in part on the predefined number of cache slots. The current cache slot may be on a current processing node of the plurality of processing nodes, and it may be determined that the data portion of the IO operation will not fit in the current cache slot of the plurality of cache slots, and selecting the IO path may include selecting, based at least in part on the predefined number and the determination that the data portion will not fit in the current cache slot, an IO path corresponding to a next processing node of the plurality of processing nodes in a predefined order of the plurality or processing nodes. The storage system further may include a plurality of physically discrete storage processing nodes, each storage processing node including a compute component for executing logic to process IO operations and a memory, the memory including a cache segment for use as part of a shared cache distributed across the plurality of processing nodes, wherein the shared cache may include the plurality of cache slots, and the current cache slot may be on a current processing node of the plurality of processing nodes, and it may be determined that the data portion of the IO operation will fit in the current cache slot of the plurality of cache slots, and, based at least in part on the determination that the data portion will fit in the current cache slot, the selected IO path may be an IO path corresponding to the current processing node. Each of the plurality of cache slots ay have a predefined size, and the software further may include executable code that determines that a size of the data portion is larger than the predetermined size, and executable code that divides the IO operation into multiple IO operation according to the predefined size. The software further may include executable code that tags an IO communication including the IO operation with an indication that the IO operation is a sequential IO operation, and executable code that sends the IO communication along the selected IO path to the storage system.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 3C is a block diagram illustrating an example of a data structure for mapping logical storage unit tracks to cache slots, according to embodiments of the invention;

FIG. 3D is a block diagram illustrating an example of a data structure defining port connectivity permissions between a storage system and one or more host systems, according to embodiments of the invention;

FIG. 4 is a block diagram illustrating an example of a system including a host system communicatively coupled to a data storage system via multiple IO paths, according to embodiments of the invention;

FIG. 5 is a block diagram illustrating an example of a plurality of logical layers of a combination of a host system and a data storage system for processing an IO request, according to embodiments of the invention;

DETAILED DESCRIPTION OF EMBODIMENTS

Figure 1:
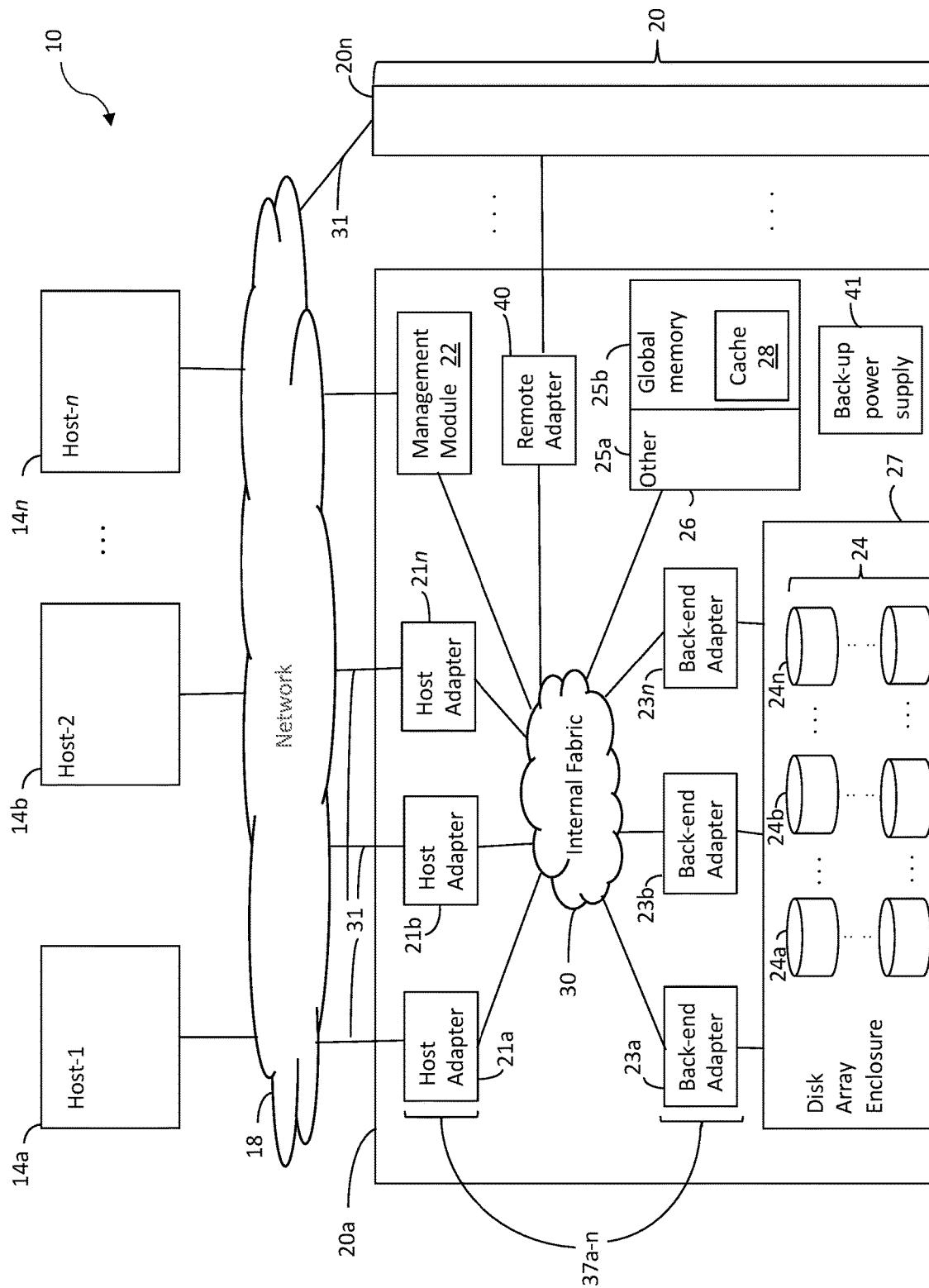
FIG. 1 is a block diagram illustrating an example of a data storage network, according to embodiments of the invention.

Some storage systems (e.g., storage arrays) may include a plurality of physically discrete and interconnected storage processing nodes (sometime referred to herein as simply "processing nodes"), where each processing node has at least a compute component (e.g., one or more CPU cores) and memory. Each processing node may be interconnected by an internal switching fabric of the storage system. For example, a PowerMax™ system made available from Dell EMC may include a plurality of interconnected director boards, where each director board may be considered a processing node. The one or more compute components may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations. In some embodiments, a processing core may be configured to serve as different functional components for different I/O operations.

In such storage systems, a cache used in processing IO operations may be distributed across multiple processing nodes, as described in more detail elsewhere herein. For example, at least a portion of the memory on each processing node may be used to implement a part of the shared cache, for example, as part of a global memory (GM) distributed across the processing nodes. As used herein, a "shared cache" is a cache that is distributed across multiple processing nodes, the use of which is shared by the multiple processing nodes.

An FA may be configured to receive IO operations from host systems and process the IO operations as described in more detail elsewhere herein. An IO operation may specify a portion of data (e.g., a chunk or a track of an LSU as described in more detail elsewhere herein), and in some cases the data portion may reside in a cache slot (described in more detail elsewhere herein) of a shared cache of the storage system. The cache slot may reside on the same processing node as the FA or another processing node physically separated from the processing node of the FA; e.g., by an internal switching fabric. Retrieving the data portion from a cache slot on another processing node takes significantly longer that retrieving the data portion from a cache slot on the same processing node, thereby increasing response times of IO operations.

A host storage system may include a multi-path driver (referred to herein as an "MP driver" and sometimes referred to in the field as an MPIO) configured with knowledge of the one or more IO paths between the host system and the processing nodes of a storage system. The MP driver may identify a processing node by an identifier (e.g., the world wide name (WWN)) of a port of the storage system associated with an FA of the processing node. In some embodiments, the MP driver (or other component of the host system) may be configured to distribute IO operations across the processing nodes of the storage system using a variety of different techniques. For example, the MP driver may be configured to implement a load balancing algorithm (LB), where it monitors the IO load of each processing node (e.g., by monitoring the IO communications sent to and received from each storage system port (SSP)), and determine the IO path (including SSP) to which to direct an IO operation in order to help balance the load across the processing nodes.

An MP driver also may implement a round robin algorithm (RR) by which it distributes IO operations to the processing nodes of the storage system in accordance with a predefined order. For example, if a there are 16 processing nodes (e.g., Node1-Node16), the MP driver may define an order of: Node1, Node2, Node3 . . . Node16. The MP driver may send a first IO operation to Node1, a second IO operation to Node2, a third IO operation to Node3, and so on, and a sixteenth IO operation to Node16, after which the MP driver may start over at the beginning of the order, i.e., circle back to Node1, and send the seventeenth IO operation to Node1, the eighteenth IO operation to Node2, and so on.

The MP driver may not have knowledge of the cache slots of the storage system, including where cache slots are located, the size of cache slots or which cache slots are associated with which data portions. That is, the MP driver may be cache-slot unaware. In some cases, a sequence of IO operations accesses consecutive logical address ranges of an LSU. An IO operation in this sequence may be referred to herein as a "sequential IO operation." For example, a host application may request to read or write a portion of contiguous data that is large (e.g., several GBs in size) relative to the data unit size (e.g., 8 KB) for IO operations and/or cache slot size (e.g., 128 KB). The host operating system or other layer of the IO stack may divide this IO request into a sequence of IO operations, each IO operation specifying a next contiguous data portion of an LSU. In such cases, two or more data portions of consecutive sequential IO operations that are small enough in size in relation to a cache-slot size may fit in a single cache slot. In other cases, two or more data portions of consecutive sequential IO operations may be the same size or larger than the cache slot size. In either case, it would beneficial to have a cache slot for data portions of sequential IO operations be on a same processing node as the FA processing the sequential IO operations, to avoid inter-processing node communications (e.g., over an internal fabric) when writing or reading the data portions to/from a cache slot. However, this may not be possible if the host system (e.g., the MP driver) is cache-slot unaware.

Thus, while LB and RR may balance workloads across processing nodes of the storage system, being cache-slot unaware may result in an inability to reduce IO processing times for sequential IO operations by placing data portions of sequential IO operations in a cache slot on a same processing node as the FA (or the like) processing the sequential IO operations. Accordingly, it may be desirable for a host system (e.g., an MP driver) to have knowledge of the cache slot size of a shared cache; e.g., to be cache-slot aware (CA).

Described herein are mechanisms and techniques for configuring a host system to be cache-slot aware, such that the host system can distribute IOs to processing nodes on a storage system according to cache slot boundaries. For example, an MP driver of the host system may determine the cache slot size from one or more communications exchanged with the storage system or may be configured with the cache slot size by a user (e.g., a host administrator). The MP driver may monitor the size of data portions in IO operations sent to the storage system, and transition between processing nodes according to slot cache slot boundaries. For example, for IO operations having data portions smaller than the cache slot size, the MP driver may direct multiple IO operations to a same processing node (i.e., a same port) until the collective size of data portions fills a cache slot; e.g., until determining that a next IO operation has a data portion that will not fit in a current cache slot. For IO operations having a data portion larger than the cache slot, the MP driver may divide the IO operation into sequential IO operations having data portions of a same size as a cache slot, and may transition between processing nodes for each IO operation or a multiple thereof. For example, the MP driver may direct every sequential IO operation having a data portion of cache slot size to a different processing node; e.g., according to an RR order; or may direct every X consecutive sequential IO operations to a same processing node before transitioning to a next processing node.

In some embodiments, even if sequential IO operations have a data portion size smaller than a cache slot size, the host system may be configured to transition between processing nodes every X cache slot(s); i.e., to consume X cache slots on one processing node before transitioning to a next processing node, where X>=1. That is, in some embodiments, regardless of data portion size, an IO distribution scheme may be implemented that transitions between processing nodes every X cache slots; or, more particularly, every X cache slots' worth of data portions, where X>=1. The value X may be referred to herein as the "cache slot transition factor" or "transition factor".

Further, in some embodiments, a storage processing node may be configured to determine that a host system is implementing a cache-slot aware, round-robin IO distribution algorithm (CA-RR), for example, from information included in a communication from the host system (e.g., a field of an IO request or a control communication). The processing node also may be configured to determine when a sufficient number of sequential IOs will be received to consume a next cache slot (e.g., of a next processing node if CC-RR is being used)—i.e., when there will be what is referred to herein as a "sequential cache slot hit." For example, the processing node may determine that there will be a sequential cache slot hit based on a field in a current IO request request being processed by the processing node or by other means. If the processing node knows that the host system is implementing CA-RR, then, in response to the processing node determining that there will be a sequential cache slot hit, the processing node may send a communication informing the next processing node about the sequential cache slot hit.

If the sequential IO operation(s) that will consume one or more cache slots on the next processing node is/are read operation(s), then, in response to being informed of the sequential cache slot hit, the next processing node may prefetch at least a cache-slot worth of next consecutive data portions of an LSU into one or more cache slots on the next processing node itself. Thus, not only is read response time reduced by having the data ready to be read from cache (e.g., in GM) when the read operation is executed instead of having to retrieve it from a physical storage device while executing the read operation, but read response time may be further reduced by having the data in one or more cache slots on a same processing node that is executing the read operation such that inter-processing node communications are avoided. A cache slot that is on the same processing node as the compute component (e.g., an FA) processing an IO operation may be referred to as a "local cache slot" in relation to the processing node and/or compute component.

If the sequential IO operation(s) that will consume one or more cache slots on the next processing node is/are write operation(s), then, in response to being informed of the sequential cache slot hit, the next processing node may request allocation of one or more local cache slots (i.e., on the next processing node itself) for the forthcoming sequential write operations. Write response time may be reduced by ensuring that the written-to cache slots are local cache slots such that inter-processing node communications are avoided.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF);

other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs).

Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing IO operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
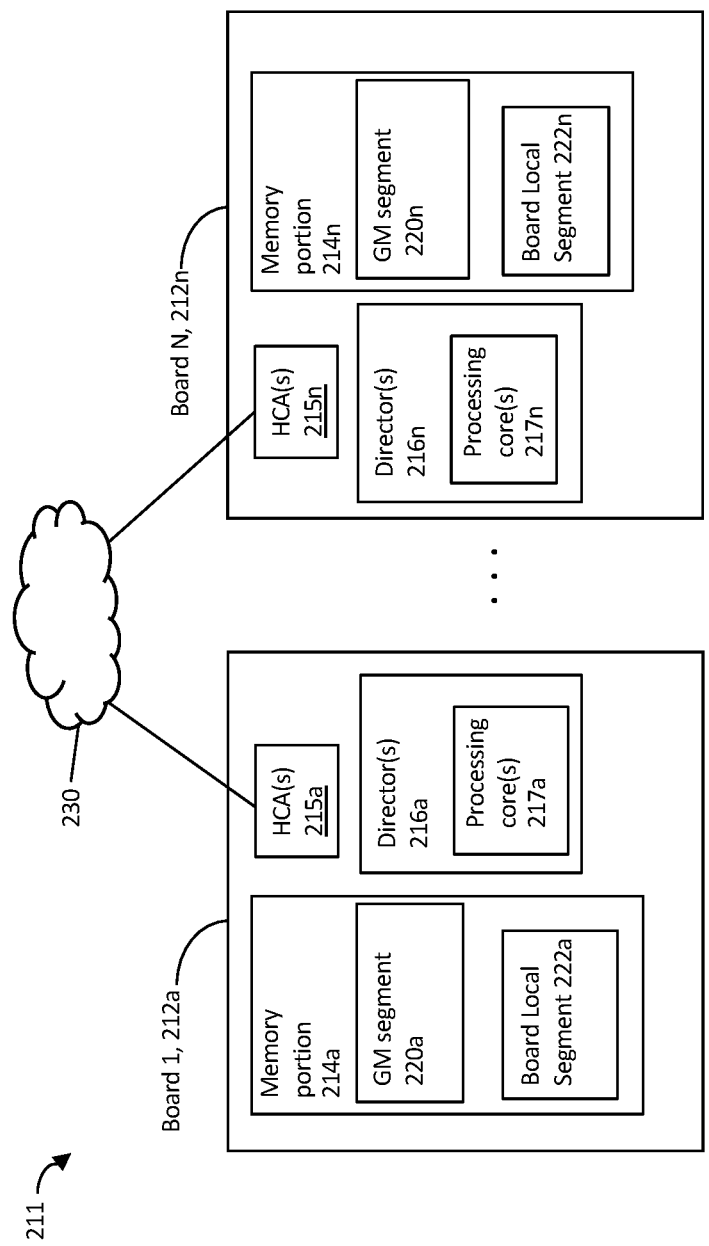
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing IO operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store IO data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
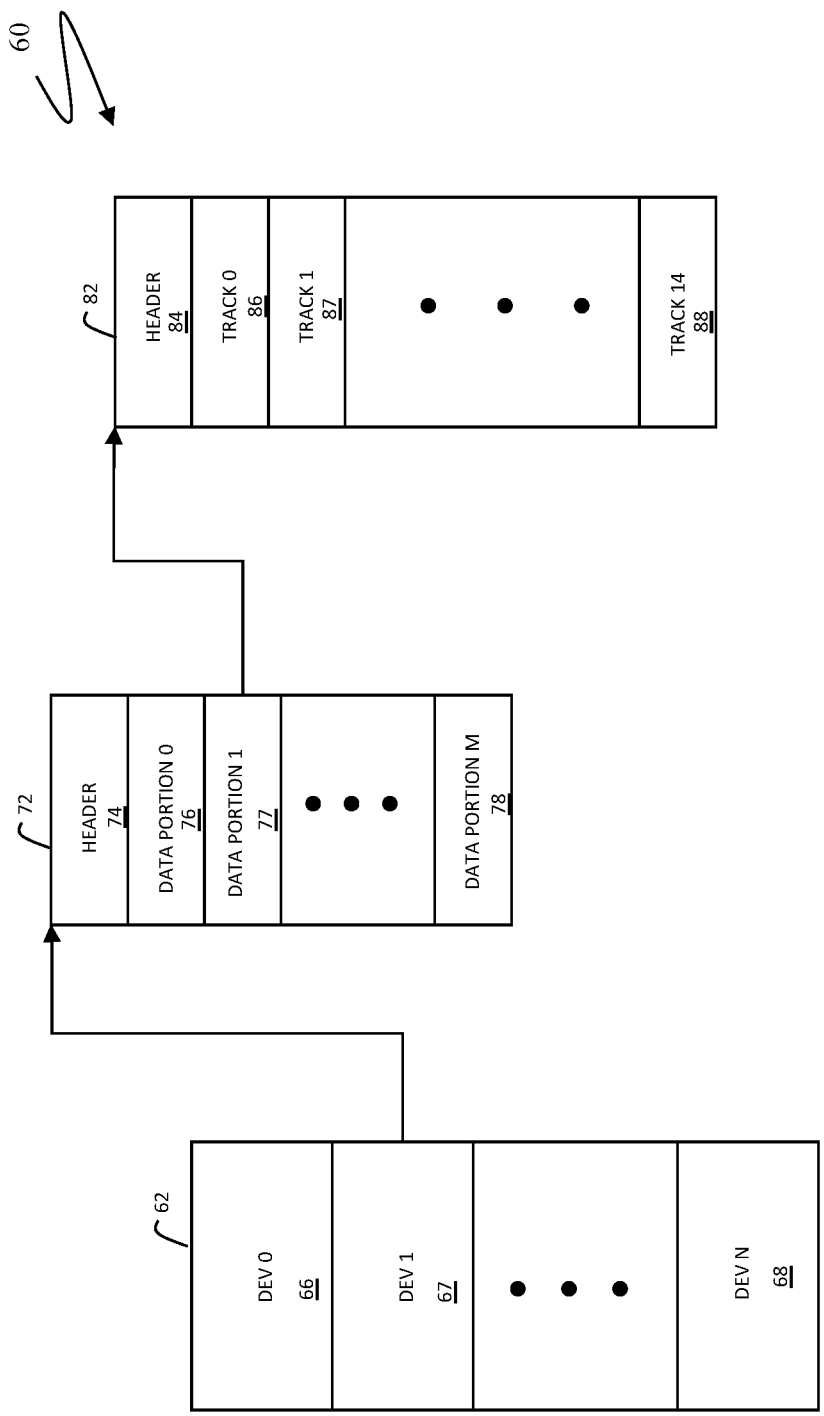
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 512 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

Storage systems (e.g., the storage system 20*a*) also may maintain data structures (e.g., masking tables) that define IO connectivity in terms of LSUs, storage ports and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which ports of a storage system ("storage ports" e.g., SCSI targets). Defining (including initially defining and later modifying) which host ports are permitted to perform IO communications with which LSUs over which storage ports, for example, using a masking table or other data structure, may be referred to as configuring or defining IO connectivity between a host port, storage port and LSU, or more simply as "masking."

FIG. 3D is a block diagram illustrating an example of a data structure 350 defining port connectivity permissions between a storage system and one or more host systems, according to embodiments of the invention. Other embodiments of a data structure defining port connectivity permissions between a storage system and one or more host systems, for example, variations of data structure 350, are possible and are intended to fall within the scope of the invention. In some embodiments, data structure 350 may be a masking table. Data structure 350 may include a plurality of entries 360, each entry representing an LSU (e.g., logical device) identified in column 352 and specifying a host port (e.g., by World Wide Name (WWN)) in column 354 with which the identified LSU is enabled to communicate IO over the storage port identified in column 356. Other information, for example, the host and/or the HBA associated with the host port and/or the HA associated with the storage port may be specified in column 358. A data structure other than a table, for example, a linked list and/or object-oriented data structure, may be used to record the same information.

The tables 62, 72, 72', 82, 300 and 350 of FIGS. 3A-3C may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82, 300 and 350. Other data structures may be stored in any of GM 25*b*, memory 25*a*, GM segment 220*a*-*n* and/or board local segments 22*a*-*n*.

FIG. 4 is a block diagram illustrating an example of a system 100 including a host system 102 communicatively coupled to a data storage system 120 via multiple IO paths, according to embodiments of the invention. Other embodiments of system including a host system communicatively coupled to a data storage system via multiple IO paths, for example, variations of system 100, are possible and are intended to fall within the scope of the invention. The system 100 may be implemented using one or more components of the system 10, for example, one or more storage systems 20*a*-*n* and/or one or more hosts 14*a*-14*n*, or variation thereof.

The system 100 may include a host system 102, switch 140 and data storage system 120. The host system 102 and data storage system 120 may communicate over one or more IO paths through the switch 140. Elements 110*a*-110*c* denote connections between the host system 102 and switch 140. Element 112*a*-112*c* denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs-LUN5, LUN6 and LUN10. It should be noted that in the illustrative embodiment of FIG. 4, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An IO request (specifying an IO operation) from the application 104 may be communicated to the data storage system 120 using the MP driver 106 and one or more other components 108. The application 104 may be a database or other application which issues data operations, such as JO operations, to the data storage system 120. Each of the JO operations may be directed to a target device, such as one of the LSUs of physical storage device 130, configured to be accessible to the host system 102 over multiple JO paths. As such, each of the JO operations may be forwarded from the application 104 to the data storage system 120 over one of the possible multiple JO paths.

The MP driver 106 may include functionality to perform any one or more different types of processing such as related to encryption, multi-pathing, mirroring, migration, and the like. For example, the MP driver 106 may include multi-pathing functionality for management and use of multiple JO paths. For example, the MP driver 106 may perform JO path selection to select one of the possible multiple JO paths based on one or more criteria such as load balancing to distribute JO requests for the target device across available active JO paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the JO operation from the host system to the data storage system 120 such as, for example, Fibre Channel (FC) or SCSI drivers, a logical volume manager (LVM), or the like. The other components 108 may include software or other components used when sending an IO operation from the application 104 to the data storage system 120, where such components may include those invoked in a call stack above and/or below the MP driver 106. For example, application 104 may issue an IO operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more JO paths. For example, all LSUs of physical storage device 130 may be accessible using ports of the three FEs 122a-122c, also denoted respectively as host adapters HA1, HA2 and HA3. The multiple IO paths allow the application IOs to be routed over multiple IO paths and, more generally, allow the LSUs of physical storage device 130 to be accessed over multiple IO paths. In the event that there is a component failure in one of the multiple IO paths, IO requests from applications can be routed over other alternate IO paths unaffected by the component failure. The MP driver 106 may be configured to perform load balancing in connection with IO path selection, as well as other processing. The MP driver 106 may be aware of, and may monitor, all IO paths between the host system and the LSUs of the physical storage device 130 in order to determine which of the multiple IO paths are active or available at a point in time, which of the multiple IO paths are unavailable for communications, and to use such information to select an IO path for host system-data storage system communications.

In the example of the system 100, each of the LSUs of the physical storage device 130 may be configured to be accessible through three IO paths. Each IO path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three IO paths—a first IO path represented by A1-B1, a second IO path represented by A2-B2 and a third IO path represented by A3-B3.

FIG. 5 is a block diagram illustrating an example of a plurality of logical layers 150 of a combination of a host system (e.g., the host system 102 of FIG. 3) and a data storage system (e.g., the data storage system 120) for processing an IO request, according to embodiments of the invention. Other embodiments of a plurality of logical layers of a combination of a host system and a data storage system for processing an IO request, for example, variations of logical layers 150, are possible and are intended to fall within the scope of the invention. FIG. 5 provides further detail regarding various software layers that may be used in connection with the MP driver 106 of FIG. 4. The various software layers of 150 may generally form layers included in the runtime IO stack, such as when an IO request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the IO received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple IO path management and selecting one of a plurality of possible IO paths for use in connection with processing IO operations and communicating with the data storage system, such as data storage system 120 of FIG. 4. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received IO request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the IO operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 5, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more IO requests specifying IO operations (e.g., read and write operations) to logical volumes (implemented by the LVM 125a) or files (implemented using the file system 123), whereby such IO requests may be mapped to IO communications (specifying the IO operation) directed to LSUs of the data storage system. Such IO operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to IO operations and other non-IO commands such as related to host system control operations. IO operations may include, for example, read and write operations with respect to data stored on an LSU.

In connection with the SCSI standard, an IO path may be defined between an initiator port of the host system and a target port of the data storage system. An IO request may be sent from the host system (e.g., from a component thereof such as an HBA), which may be referred to as an initiator, originator or source with respect to the foregoing IO path. The host system, as the initiator, sends IO requests along the IO path to a data storage system (e.g., a particular component thereof such as an HA having a port with a network address), which may be referred to as a target, destination, receiver, or responder. Each physical connection of an IO path may be between a first endpoint which is a port of the host system (e.g., such as an HBA having ports such as denoted as A1-A3 of FIG. 4) and a second endpoint which is a port of an HA (e.g., such as B1-B3 of FIG. 4) in the data storage system. Through each such IO path, one or more LSUs may be visible or exposed to the host system initiator through the target port of the data storage system.

Figure 6:
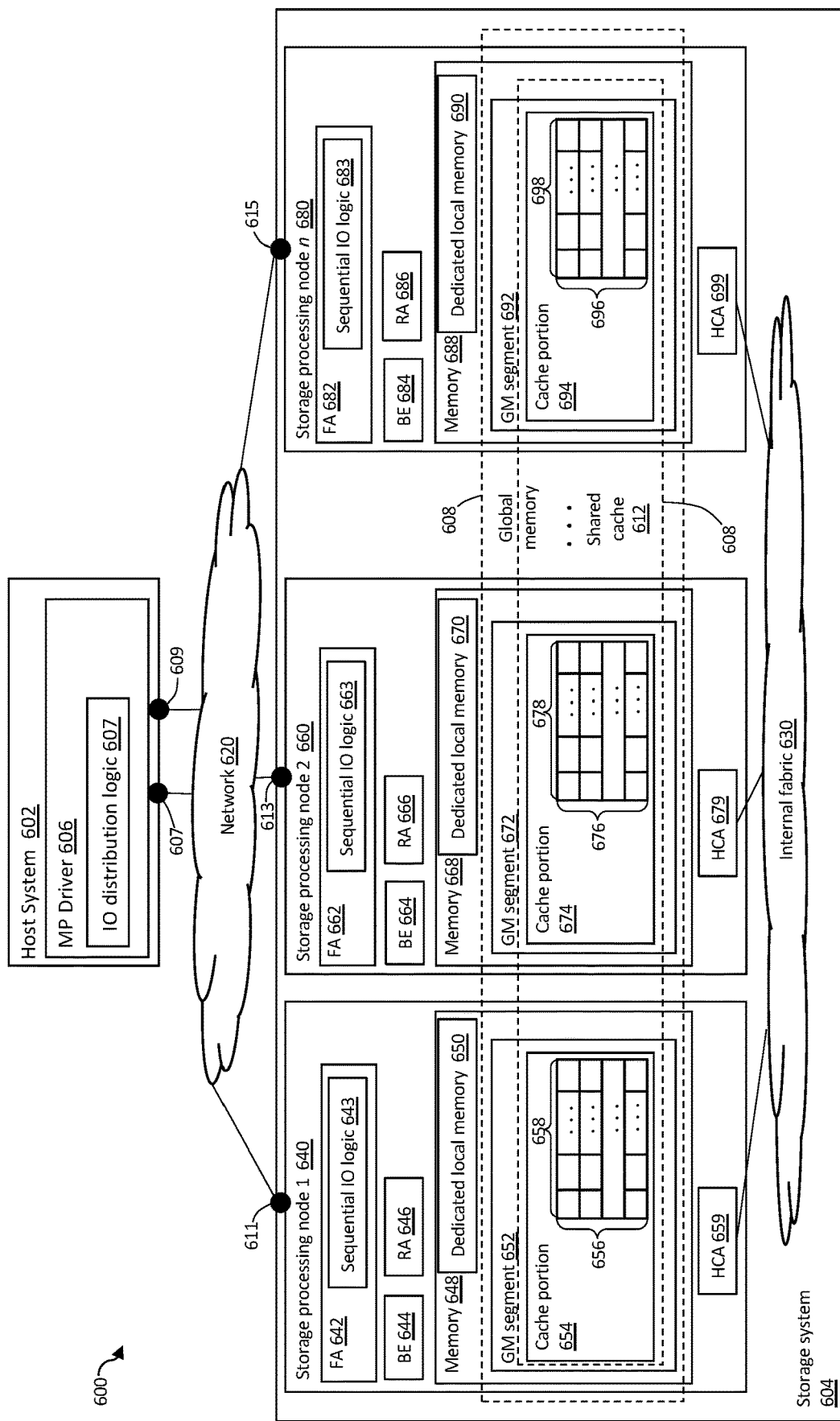
FIG. 6 is a block diagram illustrating an example of a system for managing cache for sequential IO operations, according to embodiments of the invention.

FIG. 6 is a block diagram illustrating an example of a system 600 for managing cache for sequential IO operations, according to embodiments of the invention. Other embodiments of a system for managing cache for sequential IO operations, for example, variations of the system 600, are possible and are intended to fall within the scope of the invention.

The system 600 may be a data storage network or a portion thereof, and may include any of: one or more host systems (e.g., a host system 602); a network 620 (e.g., the network 16), one or more storage systems (e.g., a storage system 604); other components; or any suitable combination of the foregoing. The host system 602 may be any of the host systems 14a-n or 102, and may include any of the components thereof and/or implement any of the functionality described herein as being implemented thereby. The host system 602 may include MP driver 606, which may be implemented as MP driver 106 or implement any of the functionality described herein as being implemented thereby. The MP driver 606 may include IO distribution logic 607, which may be configured to implement any of the IO distribution techniques and algorithms described herein, including those described in relation to a method 700 described in connection with FIG. 7.

The storage system 604 may include an internal fabric 630 (e.g., internal fabric 30) and any of storage processing nodes (or "processing nodes") 640, 660 and 680, each of which, in some embodiments, may be implemented as one of director boards 212a-n, include one or more components thereof or implement any of the functionality described herein as being implemented thereby. It should be appreciated that the storage system may include more or less than the three processing nodes illustrated. The storage system also may include a GM 608 (e.g. global memory 25*b*). The GM 608 may be distributed across multiple processing nodes, e.g., the processing nodes 640, 660 and 680, each of which may have a portion of its memory configured for use as part of GM 608 (e.g., as opposed to being dedicated to a processing node). The GM 608 may include a shared cache 612 including a plurality of cache portions included in separate processing nodes, for example, cache portions 654, 674 and 694 of processing nodes 640, 660 and 680, respectively.

The processing node 640 may include: one or more compute components, including FA 642 (e.g., one of host adapters 21*a-n* and/or directors 216*a-n*), BE 644 (e.g., one of back-end adapters 23*a-n* and/or directors 216*a-n*) and RA 646 (e.g., the remote adapter 40 and/or one of directors 216*a-n*); a memory 648 (e.g., one of memory portions 214*a-n*); an HCA 659 (e.g., one of HCAs 215*a-n*); other components; or any suitable combination of the foregoing. It should be appreciated that each processing node may include more than one FA, BE and/or RA as illustrated in FIG. 6.

The memory 648 may include a dedicated local memory (e.g., one of dedicated board local segments 22*a-n*) and GM segment 652 (e.g., one or GM segments 220*a-n*). The GM segment 652 may be configured as a portion of the global memory 608, and may include the cache portion 654 of the shared cache 612 of the GM 608. The cache portion 654 may include a plurality of cache slots 656, each cache slot including one or more (e.g., 16) sections 658. Each cache slot 656 may be of a uniform size (e.g., 128 KB) and each section may be of a uniform size (e.g., 8 KB). It should be appreciated that cache slot sizes and section sizes other than 128 KB and 8 KB, and a number of sections other than 16, may be used.

The FA 642 may include sequential IO logic 643, which may be configured to implement any of the sequential IO processing techniques and algorithms described herein, including those described in relation to a method 800 described in connection with FIG. 8.

Processing nodes 660 and 680 may include one or more of the same or similar components as the processing node 640 and/or be configured to implement the same or similar functionality. For example, the storage processing node 660 may include any of: an HCA 679; an FA 662, including sequential IO logic 663; a BE 664; an RA 666; and a memory 668, including a dedicated local memory 670 and a GM segment 672, which may include the cache portion 674; corresponding to the following components, respectively, of the processing node 640: the HCA 659; the FA 642, including sequential IO logic 643; the BE 644; the RA 646; and the memory 648, including the dedicated local memory 650 and the GM segment 652, which may include the cache portion 654. Similarly, the storage processing node 680 may include any of: an HCA 699; an FA 682, including sequential IO logic 683; a BE 684; an RA 666; and a memory 688, including a dedicated local memory 690 and a GM segment 692, which may include the cache portion 694; corresponding to the following components, respectively, of the processing node 640: the HCA 659; the FA 642, including sequential the IO logic 643; the BE 644; the RA 646; and the memory 648, including a dedicated local memory 650 and the GM segment 652, which may include the cache portion 654.

Figure 7:
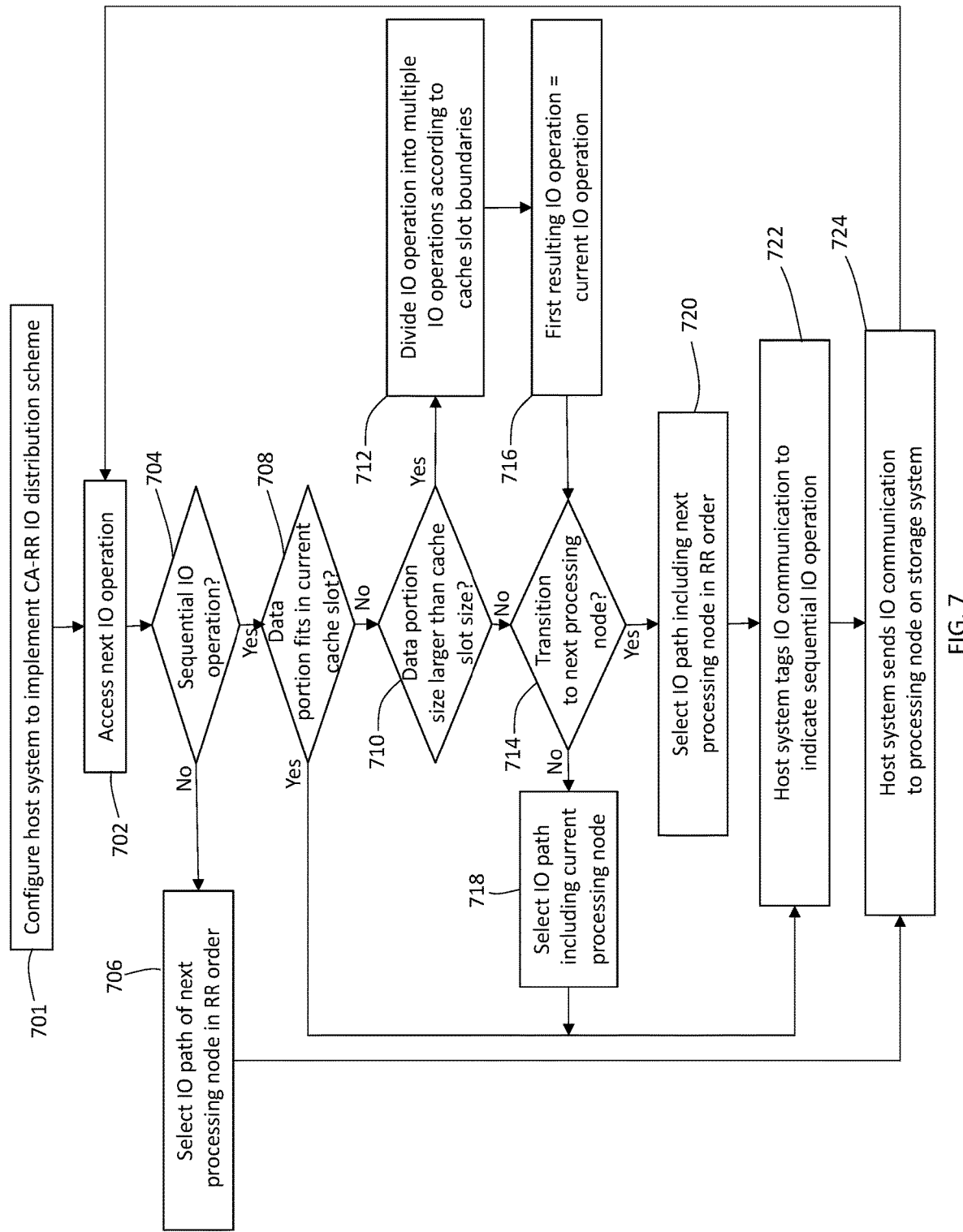
FIG. 7 is a flow chart illustrating an example of a method of a host system processing an IO operation, according to embodiments of the invention.

FIG. 7 is a flow chart illustrating an example of a method 700 of a host system processing an IO operation, according to embodiments of the invention. Other embodiments of a host system processing an IO operation, for example, variations of the method 700, are possible and are intended to fall within the scope of the invention. The method 700 may be implemented by IO distribution logic (e.g., 607) of an MP driver (e.g., 606) of a host system (e.g., 602).

In a step 701, the host system may be configured to implement a CA-RR IO distribution scheme, as described in more detail elsewhere herein. For example, the IO distribution logic 607 of the MP driver may be configured to implement CA-RR. The IO distribution logic 607 may be configured with (or have access to a data structure that specifies) the following information, which may be gleaned (at least in part) from communications with a storage system and/or a storage system administrator: a predefined size of cache slots on the data storage system; the processing nodes (e.g., identified by port ID) of the storage system for which the host system has IO connectivity; and the mapping of LSUs to processing nodes—i.e., which ports of the storage system are permitted to receive IO operations for which LSUs (e.g., as determined from switch zoning tables, storage system masking tables and the like).

The IO distribution logic 607 also may be configured with (or have access to data structure(s) that specify) the following information, which may be defined on the host system itself: one or more RR orders of processing nodes for the CA-RR scheme, and a transition factor for the CA-RR scheme. In some embodiments, only one RR order may be established for storage system, regardless of the mappings between LSUs and processing nodes. In such embodiments, the determination of the processing node to which to direct an IO operation may include applying the one RR order by default, but also check to ensure the LSU of the IO operation and the determined processing node are mapped (i.e., have permitted IO connectivity); and if not, move on to the next processing node in the RR order. In other embodiments, a separate RR order may be maintained for each LSU, which takes into account permitted IO connectivity for LSUs; and, during IO processing, the IO distribution logic may determine the LSU and apply the RR order for the LSU.

In a step 702, a next IO operation may be accessed, for example, received from the host system OS or accessed from a queue of IO operations on the host system awaiting execution. In a step 704, it may be determined whether the IO operation is a sequential IO operation using any of a variety of techniques. For example, a plurality of logical buckets may be maintained, each bucket corresponding to an LSU, where each LSU may correspond to an application executing on the host system. The bucket may include a plurality of entries, each entry representing an IO operation for the LSU previously sent or queued to be sent to a processing node of the storage system, where the number of entries of the queue may depend on how much of a history of the IO activity for the LSU is desired to be maintained. Each bucket entry may include a variety of information pertaining to the IO operation it represents, including information identifying an LSU and a data portion of the LSU, and a logical location of the data portion (e.g., in terms of LBA). Based on this information, IO distribution logic may determine previous or pending sequential IO activity for the LSU.

Further, for applications running on the host system, the host system (e.g., the OS thereof or another layer of the IO stack) may maintain queues for pending IO operations. The host system, for example, IO distribution logic thereon, may access these queues to determine future IO operations to be sent to the storage system. Given the potentially significant number of application IO queues, and thus the computation resources needed to access them to determine IO sequentiality, such queues may only be accessed if sequential IOs are preliminarily determined (e.g., predicted) from the aforementioned LSU buckets. That is, a preliminary determination of sequential IO activity, or potential sequential IO activity, for an LSU may be made from analysis of LSU buckets, and, in response to this determination, application IO queues (e.g., index information specific to the determined LSU) may be analyzed to confirm and/or glean additional information about the sequential IO activity.

It should be appreciated that the step 704 may include determining the extent of the sequential IO activity, for example: how much data (e.g., an LBA range); how many IO operations; and how much data consumed for each IO operation.

If it is determined in the step 704 that the IO operation is a sequential IO operation, then, in a step 708, it may be determined whether the data portion of the IO operation will fit in the current cache slot being populated for the current processing node. If the data portion will fit in the current cache slot, then there is no need to determine whether to transition to a next processing node to populate a next cache slot, and the method 700 may proceed to a step 722.

In the step 722, the host system may tag an IO communication including the IO operation to indicate that the IO operation is a sequential IO operation. The host system may include further information about the sequential IO activity in the IO communication, including the extent of the sequential IO activity and other information, including other information concerning sequential IO activity described herein.

In a step 724, the host system may send the IO communication to a processing node of the storage system, for example, to the port of the processing node determined in accordance with CA-RR and/or based on the determination that the IO operation is sequential, for example, as described in relation to steps 702-720. For example, the IO distribution logic 607 may have determined in the steps 702-720 that the IO is a sequential TO, and may have determined the processing node to which to direct the sequential IO operation based at least in part on: cache slot size, previously sent sequential IO operations, and a transition factor. For example, based on the values of the foregoing, the IO distribution logic may have determined to continue sending sequential IO operations to the current processing node until one or more cache slots are consumed, or to transition to a next processing node according to the RR order based on a current cache slot of the current processing node being filled.

In the case of an IO operation determined not to be sequential in the step 704, the step 724 may include sending the IO communication on the same IO path as a last (e.g., most recent) IO operation processed for the current application. In the case of an IO operation determined to be sequential in the step 704, the step 724 may include sending the IO communication on the IO path determined in the step 718 or the step 720, each described in more detail elsewhere herein.

Returning to the step 708, if it is determined in the step 708 that the data portion will not fit in the current cache slot, then it may be determined in a step 710 whether a size of the data portion of the IO operation is greater than the (e.g., predefined) size of the cache slot. If the data portion size is not greater than the (e.g., predefined) size of the cache slot, then only one more cache slot will be needed to accommodate the data portion, and the method may proceed to a step 714. In the step 714, it may be determined whether to transition to a next processing node. That is, as it was determined in the step 708 that the data portion would not fit in the current cache slot, the data portion of the current IO operation will populate a next cache slot, and the step 714 may determine whether this next cache slot will be a cache slot on the current processing node or on a cache slot on a next processing node in the RR order.

The step 720 may include factoring the transition factor and the number of cache slots that have already been consumed during a current turn of the current processing node in the RR order. The step 720 may include comparing the transition factor, TF, to the number of cache slots, Nc, that have already been consumed during a current turn of the current processing node in the RR order. If TF>Nc, then the step 714 may conclude that there is no need to transition to a next processing node, and an IO path including the current processing node (e.g., the same IO path of the last sequential IO operation for the application) may be selected in a step 718, after which the method may proceed to the step 722 described in detail elsewhere herein. For example, if the transition factor is 2 and only one cache slot has been consumed by the current processing node during its current turn in the RR order, then the method 700 may proceed to the step 718.

If TF=Nc, then the step 714 may conclude to transfer to a next processing node, and an IO path including the next processing node in the RR order for the LSU of the application may be selected in a step 718, after which the method may proceed to the step 722 described in detail elsewhere herein. For example, if the transition factor is 3 and 3 cache slots have already been consumed by the current processing node during its current turn in the RR order, then the method 700 may proceed to the step 720. It should be appreciated that if the transition factor, TF, =1, then performance of the step 712 always results in determining to transition to a next processing node (e.g., Nc always=1) and proceeding to the step 720. Accordingly, if TF=1, then the step 714 may forego comparing TF to Nc; e.g., the sequential TO logic 607 may be configured to refrain from making this comparison.

Per the step 720, the method 700 may include tracking (e.g., maintaining a counter of) the number of cache slots already consumed by the current processing node. For example, this may include resetting a cache slot consumption counter to 0 each time a transition is made to a next processing node; e.g., after performance of the step 720 and before a next performance of the step 702 (e.g., immediately following performance of the step 720). Further, this tracking may include incrementing the cache slot consumption counter by 1 each time it is determined in the step 708 that the data will not fit in the current cache slot; e.g., after performance of the step 708 and before a performance of the step 720 (e.g., immediately following performance of the step 708).

Returning to the step 710, if it is determined that the data portion size of the current TO operation is larger than the size of the current cache slot, then, in a step 712, the TO operation may be divided into multiple TO operations according to cache slot size (e.g., according to cache slot boundaries). For example, if the cache slot size is 128 KB (e.g., if all cache slots have a predefined size of 128 KB), and the data portion size is 680 KB, the IO operation may be divided into 6 TO operations, the first 5 having a data portion size of 128 KB and the last TO operation having a size of 40 KB. As another example, if the cache slot size is 128 KB (e.g., if all cache slots have a predefined size of 128 KB), and the data portion size is 144 KB, the IO operation may be divided into 2 TO operations, the first IO operation having a data portion size of 128 KB and the second IO operation having a size of 16 KB.

As illustrated by the step 716, the first of the multiple TO operations resulting from performance of the step 712 may become the current IO operation to be further processed in the steps 714 and 718-724. The remaining TO operations resulting from performance of the step 712 may be placed in order in a queue on the host system (e.g., a queue of an MP driver of the host system) to be processed in accordance with the method 700. After performance of the steps 712 and 714, the method 700 may proceed to the step 714 described elsewhere herein.

Returning to the step 702, if it is determined in the step 702 that the JO operation is not a sequential JO operation, then there may not be any benefit in performing steps 708-722 to take into consideration cache slot boundaries in processing the JO operation, in which case the method 700 may proceed to step 706. In the step 706, an JO path including the next processing node in the RR order for the LSU corresponding to the application may be selected. That is, the JO operation may be directed to a next processing node in accordance with the RR order for the LSU, but irrespective of cache slot size and the transition factor. Following the step 706, the method 700 may proceed to the step 724 described in detail elsewhere herein, without performing the step 722. That is, the JO communication including the JO operation is not tagged to indicate that the JO operation is a sequential JO operation.

Figure 8:
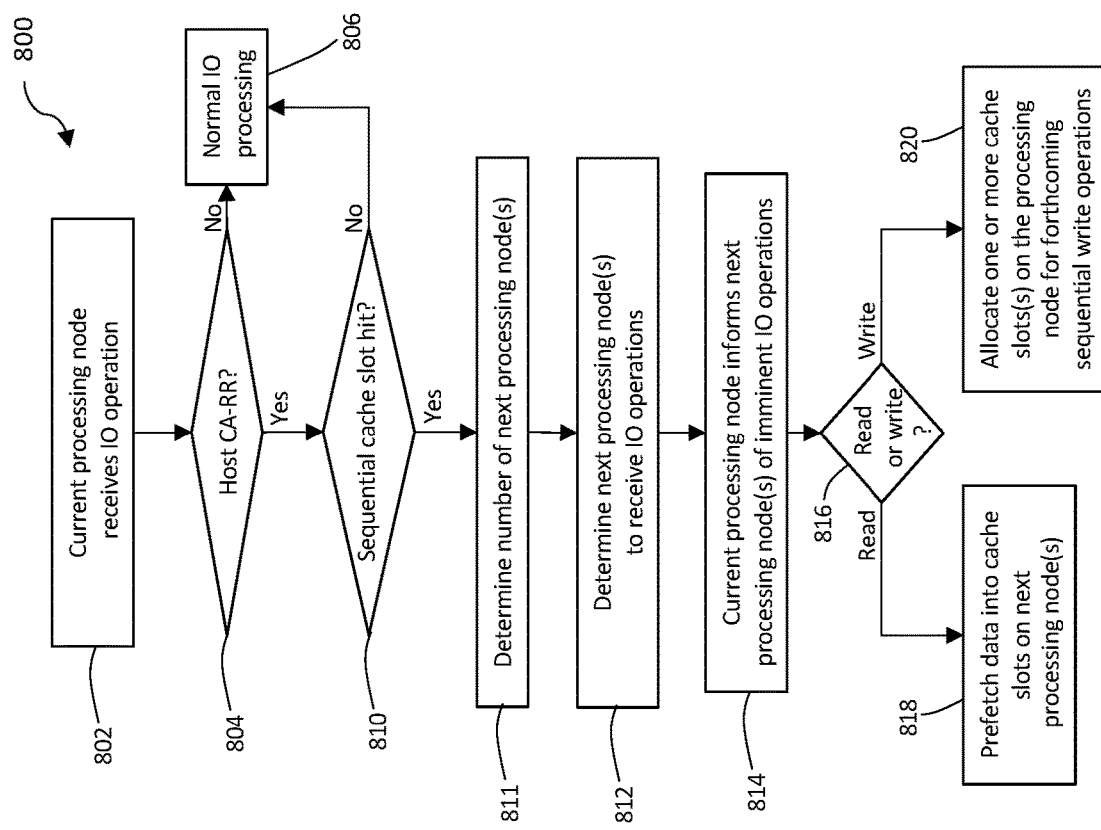
FIG. 8 is a flow chart illustrating an example of a method of managing cache for sequential IO operations, according to embodiments of the invention.

FIG. 8 is a flow chart illustrating an example of a method 800 of managing cache for sequential IO operations, according to embodiments of the invention. Other embodiments of a method of managing cache for sequential IO operations, for example, variations of the method 800, are possible and are intended to fall within the scope of the invention. The method 800 may be implemented by sequential IO logic (e.g., 643, 663 and/or 683) on one or more processing nodes (e.g., 640, 660 and/or 680).

In a step 802, the current processing node may receive an IO operation from the host system; e.g., on a port of the processing node. In a step 804, it may be determined whether the host system is implementing CA-RR. If the host system is not implementing CA-RR, then normal (e.g., default) JO processing may be performed on the received JO operation in a step 806; i.e., there may not be any special handling of the JO operation regardless of whether it is a sequential JO operation.

If it is determined that CA-RR is being implemented by the host system, then it may be determined in a step 810 whether there will be a sequential cache slot hit. This determination may be made by reading a bit in the IO communication received from the host system that specified the IO operation, where a value of the bit may be defined by the host system, e.g., an MD driver on the host system, or by other techniques. For example, an FA or other component (e.g., management module 22) may be configured to apply a prediction algorithm, including any of those known or later developed, to predict future sequential IO activity, which may include determining an extent (e.g., a logical address range) of such sequential activity. Determining (e.g., forecasting or predicting) whether there will be a sequential cache slot hit may include factoring: cache slot size; an amount of remaining space in the current cache slot being used; a transition factor (if the host system is CA); and the determined extent of future sequential read activity. For example, if the transition factor is 1 (i.e., transition each time a cache slot is filled), then it may be determined that there will be a sequential cache slot hit if there is enough logical address space consumed by the data portions of the determined number of next consecutive sequential IO operations to consume the remainder of the current cache slot and a next cache slot.

It should be appreciated that determining whether there were will be a sequential cache slot hit may include determining whether there is enough sequential IO activity to consume more than one next cache slot; e.g., if the transition factor is 2 or more. In such cases, another factor to be considered when determining whether there will be a sequential cache slot hit is the number of cache slots that have already been consumed during a current turn of the current processing node in the RR order. For example, if the transition factor is 3, and 1 cache slot of the current processing node has already been fully consumed during its current turn, then it may be determined that there will be a sequential cache slot hit if there is enough logical address space consumed by the determined number of next consecutive sequential IOs to consume: the remainder of the current cache slot; the remaining next cache slot of the current processing node (for a total of 3 consumed cached slots); and at least one cache slot of the next processing node in the RR order.

If it is determined in the step 810 that there will not be a sequential cache slot hit, then the method 800 may proceed to the step 806. Otherwise, in a step 811, the number of next processing nodes to receive IO operations as a result of the sequential cache slot hit may be determined. The number of processing nodes determined in the step 811 may depend on multiple factors, including, but not limited to: cache slot size; an amount of remaining space in the current cache slot being used; a transition factor; if the transition factor is 2 or more, the number of cache slots that have already been consumed during a current turn of the current processing node; and the determined extent of future sequential read activity. For example, the number of affected processing nodes, Np, may be defined by the following Equation 1:

$$Np = \text{quotient}((T-Rcn)/CS)/TF, \quad \text{Equation 1:}$$

where: T=total amount of logical address space consumed by the data portions of the determined number of next consecutive sequential IOs operations; Rcn=remaining logical address space to be consumed in current processing node; CS=cache slot size (e.g., in terms of logical address space); and TF=the transition factor. The remaining logical address space to be consumed in the current processing node, Rcn, may be defined by Equation 2:

$$Rcn = Rcc + (Nr*CS) \quad \text{Equation 2:}$$

where: Rcc=remaining logical address space to be consumed in current cache slot; and Nr=the number of remaining cache slots to be consumed in the current processing node. Nr may be determined based on the transition factor, TF, and the number of cache slots already consumed on the processing node during the current turn, Nc. That is, Nr=TF−1−Nc. If the transition factor is 1, then Nc=0 and Rcn=Rcc.

For example, if the total amount of logical address space consumed by the data portions of the determined number of next consecutive sequential IOs operations=300 KB, the cache slot size, CS, =128 KB, the remaining logical address space to be consumed in current cache slot, Rcc, =16 KB, and the transition factor, TF, =1, then Rcn=Rcc=16, and the number of processing nodes to be affected by the sequential cache slot hit=quotient((300−16)/128)=quotient(284/128)= 2. As another example, if the total amount of logical address space consumed by the data portions of the determined number of next consecutive sequential IOs operations=1 MB, the cache slot size, CS=128 KB, the remaining logical address space to be consumed in current cache slot, Rcc, =40 KB, the transition factor, TF, =3, and the number of consumed cache slots on the current processing node, Nc=1, then Nr=3−1−1=1; Rcn=40+(1*128)=168, and the number of processing nodes to be affected by the sequential cache slot hit, Np=quotient((1000−168)/128)=quotient((1000−168)/128)=6.

In a step 812, the next one or more processing nodes to receive an IO operation may be determined. For example, the sequential IO processing logic of a processing node may be configured to determine (e.g., by accessing a data structure) the order of processing nodes defined for the RR IO distribution scheme employed, which may have been previously conveyed by the host system to the storage system, e.g., in a control communication, or manually, and the RR order recorded on the storage system (e.g., in memory of one or more of the processing boards). The RR order be simply an ordered list of identifiers unique to each processing node in the RR order, for example, a port ID (e.g., WWN) for the processing node. For example, if the step 811 determined that the number of next processing nodes to be affected as a result of the sequential cache hit is 5, then the step 812 may determine unique identifiers of the next 5 processing nodes in the RR order. It should be appreciated that the steps 810, 811 and 812 may be performed as part of one integral operation and that steps 810 and 811 may be performed concurrently to the step 812.

It should be appreciated that, in some embodiments, a separate RR order may be maintained for each LSUs, based on permitted IO connectivity between the host system and the processing nodes of the storage system, as described in more details elsewhere herein. In such embodiments, the step 812 may include applying the RR order specific to the LSU of the sequential IO operations. In other embodiments, one master RR order may be used for all LSUs, in which case the step 812 may include accessing masking table (e.g., 350) to determine whether the next processing node in the RR order is masked to the LSU. If not, a next processing node in the RR order may be accessed. It may be desirable to use the same LSU-specific RR order or one master RR order that the host system using, and communications may be exchanged between the host system and the storage system to do so; e.g., prior to the processing of the sequential IO operations.

In a step 814, the current processing node may inform the one or more next processing nodes affected by the sequential cache slot hit of the sequential IO operations to soon be sent to the processing nodes(s) by the host system. For example, the current processing node may send a communication to each next processing node on the internal fabric of the storage system. Such communication may include additional information pertinent to the forthcoming sequential IO operations, including, for example, information specifying: a type of the IO operation (e.g., read or write); an indication that the IO operations are sequential; identifiers of the data portions of the sequential IO operations; the logical block addresses of the data portions of the sequential IO operations; the number of cache slots on the processing node to be consumed; an identifier of the host system from which the forthcoming sequential IO operations originate; an identifier of the port of the host system; an identifier of the application associated with the forthcoming sequential IO operations; other information, including information that can be derived from any of the foregoing; or any suitable combination of the foregoing.

The steps 816, 818 and 820 may be performed by and/or for each processing node affected by the sequential cache slot hit; i.e., each processing node that is informed as part of the step 814. In a step 816, it may be determined whether the forthcoming sequential IO operations are read or write operations. If such IO operations are read operations, then, in a step 818, data for the data portions of the forthcoming sequential read operations may be prefetched from one or more physical storage devices into one or more cache slots of the processing node. The number of the one or more cache slots may have been determined as part of performance of steps 810, 811 and 812, and conveyed by the current processing node.

If it is determined in the step 816 that the forthcoming sequential IO operations are write operations, then, in a step 820, one or more cache slots (e.g., depending on determinations made in steps 810, 811 and/or 812) on the next processing node may be allocated for forthcoming sequential write operations. For example, the next processing node may request such an allocation from a cache management component. The cache management component may be implemented on one or more processing nodes and/or other components of the storage system, collectively or separately. The cache memory component may be part of a memory management component of the storage system.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 700 and 800, or parts thereof, may be implemented using one or more of the systems and/or data structures described in relation to FIGS. 1-6, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of an ordinal term, e.g., "first,"

"second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage network including a storage system having a plurality of physical storage devices for storing data and a memory cache including a plurality of cache slots, and a host system having an application executing thereon that results in input/output (IO) operations being sent to the storage system, a method performed on the host system comprising:
    accessing an IO operation received from the application executing on the host system;
    determining that the IO operation is a sequential IO operation;
    determining whether a data portion of the IO operation would fit in a current cache slot of the plurality of cache slots currently being used for IO operations of the application; and
    selecting an IO path between the host system and the storage system for the IO operation based at least in part on the determination of whether a data portion would fit in the current cache slot.

2. The method of claim 1, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots, the method further comprising:
    determining a predefined number of cache slots to be consumed on a processing node for sequential IO operations before transitioning to a next processing node,
    wherein the IO path is selected based at least in part on the predefined number of cache slots.

3. The method of claim 2, wherein the current cache slot is on a current processing node of the plurality of processing nodes,
    wherein it is determined that the data portion of the IO operation would not fit in the current cache slot of the plurality of cache slots, and
    wherein selecting the IO path includes selecting, based at least in part on the predefined number and the determination that the data portion would not fit in the current cache slot, an IO path corresponding to a next processing node of the plurality of processing nodes in a predefined order of the plurality or processing nodes.

4. The method of claim 2, wherein the current cache slot is on a current processing node of the plurality of processing nodes,
    wherein it is determined that the data portion of the IO operation would not fit in the current cache slot of the plurality of cache slots, and
    wherein selecting the IO path includes selecting, based at least in part on the predefined number and the determination that the data portion would not fit in the current cache slot, an IO path corresponding to the current processing node.

5. The method of claim 1, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots,
    wherein the current cache slot is on a current processing node of the plurality of processing nodes,
    wherein it is determined that the data portion of the IO operation would fit in the current cache slot of the plurality of cache slots, and
    wherein, based at least in part on the determination that the data portion would fit in the current cache slot, the selected IO path is an IO path corresponding to the current processing node.

6. The method of claim 1, wherein each of the plurality of cache slots has a predefined size, and wherein the method further comprises:
    determining that a size of the data portion is larger than the predetermined size; and
    dividing the IO operation into multiple IO operation according to the predefined size.

7. The method of claim 1, further comprising:
    tagging an IO communication including the IO operation with an indication that the IO operation is a sequential IO operation; and
    sending the IO communication along the selected IO path to the storage system.

8. A host system for a storage network including a storage system having a plurality of physical storage devices for storing data and a memory cache including a plurality of cache slots, and the host system, the host system comprising:
    an application executing on the host system resulting in input/output (IO) operations being sent to the storage system; and
    a memory having code thereon that, when executed, performs a method including:
        accessing an IO operation received from the application executing on the host system;
        determining that the IO operation is a sequential IO operation;
        determining whether a data portion of the IO operation would fit in a current cache slot of the plurality of cache slots currently being used for IO operations of the application; and
        selecting an IO path between the host system and the storage system for the IO operation based at least in part on the determination of whether a data portion would fit in the current cache slot.

9. The host system of claim 8, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots, and
    wherein the method further includes determining a predefined number of cache slots to be consumed on a processing node for sequential IO operations before transitioning to a next processing node, wherein the IO path is selected based at least in part on the predefined number of cache slots.

10. The host system of claim 9, wherein the current cache slot is on a current processing node of the plurality of processing nodes,
   wherein it is determined that the data portion of the IO operation would not fit in the current cache slot of the plurality of cache slots, and
   wherein selecting the IO path includes selecting, based at least in part on the predefined number and the determination that the data portion would not fit in the current cache slot, an IO path corresponding to a next processing node of the plurality of processing nodes in a predefined order of the plurality or processing nodes.

11. The host system of claim 9, wherein the current cache slot is on a current processing node of the plurality of processing nodes,
   wherein it is determined that the data portion of the IO operation would not fit in the current cache slot of the plurality of cache slots, and
   wherein selecting the IO path includes selecting, based at least in part on the predefined number and the determination that the data portion would not fit in the current cache slot, an IO path corresponding to the current processing node.

12. The host system of claim 8, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots,
   wherein the current cache slot is on a current processing node of the plurality of processing nodes,
   wherein it is determined that the data portion of the IO operation would fit in the current cache slot of the plurality of cache slots, and
   wherein, based at least in part on the determination that the data portion would fit in the current cache slot, the selected IO path is an IO path corresponding to the current processing node.

13. The host system of claim 8, wherein each of the plurality of cache slots has a predefined size, and wherein the method further includes:
   determining that a size of the data portion is larger than the predetermined size; and
   dividing the IO operation into multiple IO operation according to the predefined size.

14. The host system of claim 8, wherein the method further includes:
   tagging an IO communication including the IO operation with an indication that the IO operation is a sequential IO operation; and
   sending the IO communication along the selected IO path to the storage system.

15. For a storage network including a storage system having a plurality of physical storage devices for storing data and a memory cache including a plurality of cache slots, and a host system having an application executing thereon that results in input/output (IO) operations being sent to the storage system and having a computer-readable media having software stored thereon, the software comprising:
   executable code that accesses an IO operation received from the application executing on the host system;
   executable code that determines that the IO operation is a sequential IO operation;
   executable code that determines whether a data portion of the IO operation would fit in a current cache slot of the plurality of cache slots currently being used for IO operations of the application; and
   executable code that selects an IO path between the host system and the storage system for the IO operation based at least in part on the determination of whether a data portion would fit in the current cache slot.

16. The computer-readable media of claim 15, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots, the software further comprising:
   executable code that determines a predefined number of cache slots to be consumed on a processing node for sequential IO operations before transitioning to a next processing node,
   wherein the IO path is selected based at least in part on the predefined number of cache slots.

17. The computer-readable media of claim 16, wherein the current cache slot is on a current processing node of the plurality of processing nodes,
   wherein it is determined that the data portion of the IO operation would not fit in the current cache slot of the plurality of cache slots, and
   wherein selecting the IO path includes selecting, based at least in part on the predefined number and the determination that the data portion would not fit in the current cache slot, an IO path corresponding to a next processing node of the plurality of processing nodes in a predefined order of the plurality or processing nodes.

18. The computer-readable media of claim 15, wherein the storage system further includes a plurality of physically discrete storage processing nodes, each storage processing node including a compute component for executing logic to process IO operations and a memory, the memory including a cache segment for use as part of a shared cache distributed across the plurality of processing nodes, wherein the shared cache includes the plurality of cache slots,
   wherein the current cache slot is on a current processing node of the plurality of processing nodes,
   wherein it is determined that the data portion of the IO operation would fit in the current cache slot of the plurality of cache slots, and
   wherein, based at least in part on the determination that the data portion would fit in the current cache slot, the selected IO path is an IO path corresponding to the current processing node.

19. The computer-readable media of claim 15, wherein each of the plurality of cache slots has a predefined size, and wherein the software further comprises:
   executable code that determines that a size of the data portion is larger than the predetermined size; and
   executable code that divides the IO operation into multiple IO operation according to the predefined size.

20. The computer-readable media of claim 15, wherein the software further comprises:
  executable code that tags an IO communication including the IO operation with an indication that the IO operation is a sequential IO operation; and
  executable code that sends the IO communication along the selected IO path to the storage system.

* * * * *

UNITED STATES PATENT AND TRADEMARK OFFICE
CERTIFICATE OF CORRECTION

PATENT NO. : 11,048,638 B1  
APPLICATION NO. : 16/779727  
DATED : June 29, 2021  
INVENTOR(S) : Jack Fu et al.

Page 1 of 1

It is certified that error appears in the above-identified patent and that said Letters Patent is hereby corrected as shown below:

On the Title Page

Item (54) and in the Specification, Column 1, Lines 1-2:
In the title "HOST CACHE-SLOT AWARE 10 MANAGEMENT" should read -- HOST CACHE-SLOT AWARE IO MANAGEMENT --

Signed and Sealed this  
Ninth Day of August, 2022

Katherine Kelly Vidal  
*Director of the United States Patent and Trademark Office*